United States Patent
Palenius et al.

(10) Patent No.: US 11,284,326 B2
(45) Date of Patent: Mar. 22, 2022

(54) HANDOVER CONTROL

(71) Applicant: Telefonaktiebolaget LM Ericsson (publ), Stockholm (SE)

(72) Inventors: Torgny Palenius, Barsebäck (SE); Henrik Ronkainen, Södra Sandby (SE); Christer Östberg, Staffanstorp (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 16/975,814

(22) PCT Filed: Feb. 27, 2018

(86) PCT No.: PCT/EP2018/054818
§ 371 (c)(1),
(2) Date: Aug. 26, 2020

(87) PCT Pub. No.: WO2019/166076
PCT Pub. Date: Sep. 6, 2019

(65) Prior Publication Data
US 2020/0413315 A1    Dec. 31, 2020

(51) Int. Cl.
*H04W 4/00* (2018.01)
*H04W 36/30* (2009.01)
*H04W 36/00* (2009.01)

(52) U.S. Cl.
CPC ....... *H04W 36/30* (2013.01); *H04W 36/0061* (2013.01); *H04W 36/0085* (2018.08)

(58) Field of Classification Search
CPC ............. H04W 36/30; H04W 36/0085; H04W 36/0061; H04W 24/10
(Continued)

(56) References Cited

U.S. PATENT DOCUMENTS 8,331,940 B2 * 12/2012 Kim ...................... H04W 24/10
455/436
8,682,329 B2 * 3/2014 Kim .................. H04W 36/0094
455/436

(Continued)

OTHER PUBLICATIONS

International Search Report dated May 14, 2018 for International Application No. PCT/EP2018/054818 filed on Feb. 27, 2018, consisting of 18-pages.

(Continued)

*Primary Examiner* — Amancio Gonzalez
(74) *Attorney, Agent, or Firm* — Christopher & Weisberg, P.A.

(57) ABSTRACT

A handover control method is disclosed for a wireless communication device connected to a serving network node which provides a serving cell. The method comprises establishing a handover control configuration, shared by the WCD and the SNWN, comprising a neighboring cell measurement triggering criterion, a handover triggering criterion, and transmission resource parameters for measurement signals of a neighboring cell. The method also comprises performing channel quality measurements of the serving cell and detecting fulfillment of the neighboring cell measurement triggering criterion based on the channel quality measurements of the serving cell. The method also comprises performing channel quality measurements of the neighboring cell and detecting fulfillment of the handover triggering criterion based on the channel quality measurements of the neighboring cell.

13 Claims, 7 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 8,849,271 | B2* | 9/2014 | Moberg | H04W 36/0094 455/424 |
| 8,868,080 | B2* | 10/2014 | Wang | H04W 36/0007 455/437 |
| 9,655,014 | B2* | 5/2017 | Wegmann | H04W 36/0033 |
| 9,693,281 | B2* | 6/2017 | Chockalingam | H04W 36/30 |
| 9,913,192 | B2* | 3/2018 | Kim | H04L 5/001 |
| 10,470,068 | B2* | 11/2019 | Yiu | H04W 24/10 |
| 10,687,299 | B2* | 6/2020 | Adjakple | H04W 68/005 |
| 10,986,548 | B2* | 4/2021 | Yiu | H04W 36/0094 |
| 11,109,416 | B2* | 8/2021 | Kim | H04W 74/02 |
| 2015/0334612 | A1* | 11/2015 | Ray Chaudhuri | H04W 36/20 455/437 |
| 2016/0315721 | A1 | 10/2016 | Lee et al. | |
| 2017/0086107 | A1* | 3/2017 | Hu | H04B 17/382 |
| 2020/0367125 | A1* | 11/2020 | Yoon | H04W 36/38 |

OTHER PUBLICATIONS

R2-1710544; 3GPP TSG RAN WG2 #99bis; Title: Measurement configuration and procedures for CSI-RS; Agenda Item: 10.4.1.4.3; Source: Huawei, HiSilicon; Document for: Discussion; Date and Location: Oct. 9-13, 2017, Prague, Czech Republic; consisting of 5-pages.

R2-1706730; 3GPP TSG-RAN WG2 NR Ad-hoc; Title: Measurement configuration and procedures for SS and CSI-RS; Agenda Item: 10.4.1.4.4; Source: Huawei, HiSilicon; Document for: Discussion; Date and Location: Jun. 27-29, 2017, Qingdao, China; consisting of 6-pages.

R1-1707051; 3GPP TSG RAN WG1 Meeting #89; Title: RRM measurements on CSI-RS for L3 mobility; Agenda Item 7.1.1.5.2; Source: ZTE; Document for: Discussion and Decision; Date and Location: May 15-19, 2017, Hangzhou, P. R. China; consisting of 8-pages.

R1-1712827; 3GPP TSG RAN WG1 Meeting #90; Title: Measurement based on CSI-RS for L3 mobility; Agenda Item 6.1.1.5.2; Source: Vivo; Document for: Discussion and Decision; Date and Location: Aug. 21-25, 2017, Prague, Czech Republic; consisting of 4-pages.

* cited by examiner

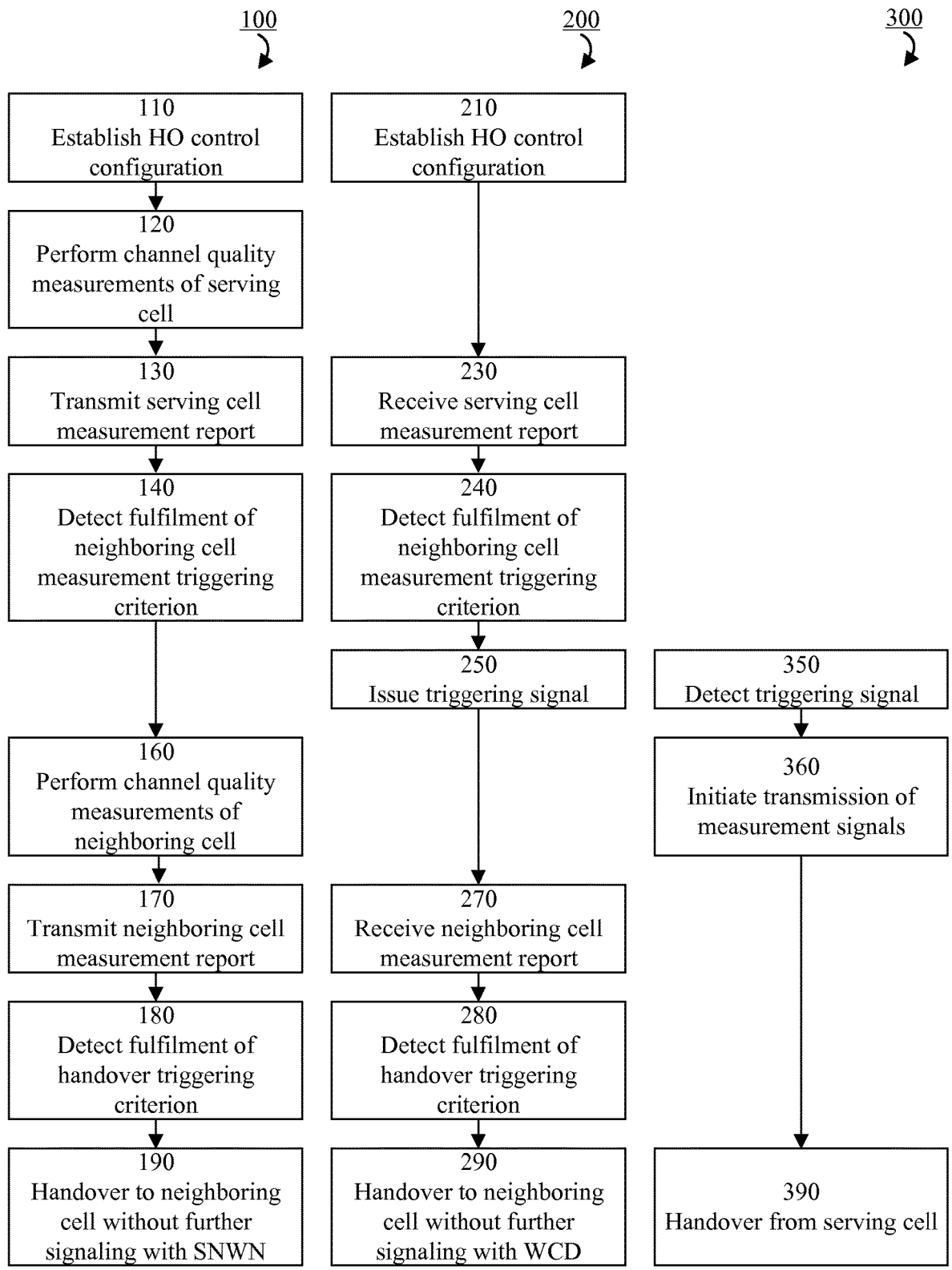

HANDOVER CONTROL

CROSS-REFERENCE TO RELATED APPLICATIONS

This application is a Submission Under 35 U.S.C. § 371 for U.S. National Stage Patent Application of International Application Number: PCT/EP2018/054818, filed Feb. 27, 2018 entitled "HANDOVER CONTROL," the entirety of which is incorporated herein by reference.

TECHNICAL FIELD

The present disclosure relates generally to the field of wireless communication in cellular communication networks. More particularly, it relates to handover control in relation to such wireless communication.

BACKGROUND

Wireless communication systems are continuously evolving. In association with this evolvement, it is expected that more and more different use cases and applications will be covered and that many different frequency bands are employed for operation. Different radio requirements may need to be fulfilled in various situations emanating from a wide range of applications, frequency bands (e.g., from below 1 GHz to 100 GHz), bandwidths, different modes of operations (e.g., licensed vs. unlicensed), etc. Such radio requirements may typically be subject to, e.g., regulatory requirements in specific geographical regions (e.g., countries), the specific frequency band/sub-band used, etc. Moreover, the circuitry of the wireless communication device (WCD, e.g., a user equipment, UE) may typically need to be adapted to fulfill regulatory constraints, for functioning in relation to radio frequency planning, and to achieve a device capability. The WCD circuitry is also important in optimization of performance and power consumption.

The evolving fifth generation (5G) cellular wireless communication networks (including the concept of new radio (NR)) are envisioned to overcome some limitations of existing cellular wireless communication networks by providing higher data rates, improved user experience, lower energy consumption, and increased traffic capacity. To provide additional spectrum beyond what was previously allocated to existing cellular wireless communication network standards, use of high frequency bands; including licensed, unlicensed and licensed-shared spectrum; and allowing for wider bandwidths may be considered. To handle growth in traffic volume, advanced antenna solutions and denser deployments may be considered in addition to wider frequency bands and new spectrum. In addition, a massive growth in the number of connected devices as well as an increasingly wide range of new applications is expected. Other evolving technologies, including the fourth generation (4G) cellular wireless communication networks and Wi-Fi, are challenged by similar demands.

Multi-antenna technologies have a key role in the design of modern Radio Access Technologies (RATs) due to their well-recognized benefits. Specifically, they enable array gain, spatial multiplexing, and spatial diversity, which lead to improved coverage, capacity, and robustness.

Multi-antenna technologies have an even larger relevance in high frequency bands. For instance, high frequency propagation is subject to several loss factors such as high atmospheric attenuation, rain fade, foliage attenuation, building penetration, wall penetration, diffraction, body loss, and obstruction loss. While some of the mentioned loss aspects might be considered as minor problems for low frequency bands, their impact typically becomes severe in millimeter wave frequency ranges, thereby limiting the potential range of wireless communications. On the other hand, high frequency bands allow for shorter frequency reuse distances, larger bandwidth, and smaller beam width than low frequency bands, thereby enabling higher gain which may compensate, at least to some extent, for the higher path loss.

In new radio (NR) the antenna beams may be depending on the WCD and controlled by the precoding matrix indicator (PMI) reports which are based on the channel state information reference signal (CSI-RS) symbols, or the antenna beams may be fixed beams where the WCD detects and measures—on mobility reference signal (MRS) or on CSI-RS symbols—each beam individually and continuously selects the best beam.

Mobility between cells based on the CSI-RS symbols will be used as an illustrative scenario herein. The CSI-RS symbols are transmitted in the downlink (DL) and are primarily intended to be used by a WCD to acquire channel state information (CSI). However, they may also serve other purposes, e.g., channel estimation, signal discovery, beam tracking, beam scanning, and synchronization. Alternatives to the use of CSI-RS for these purposes include using downlink demodulation reference signal (DL-DMRS) or tracking reference symbols (TRS).

Each CSI-RS transmission is scheduled and may be in the same frequency resources as a physical downlink channel (PDCH) data transmission or in frequency resources unrelated to the PDCH data transmissions.

In general, no interdependence can be assumed between CSI-RS in different transmissions. Hence, the WCD should typically not perform filtering in time when CSI-RS is considered. However, a WCD may be (explicitly or implicitly) configured to assume interdependence between CSI-RS in different transmissions; for example to support time-filtering of CSI-RS measurements.

In general, WCD filtering may be controlled by the network, including filtering (in time, frequency and over diversity branches) of CSI-RS. In some transmission formats, CSI-RS is situated in a separate orthogonal frequency division multiplexing (OFDM) symbol to better support analog beam-forming.

CSI-RS is configured for measurements by WCDs. Therefore, if there are no WCDs configured with the CSI-RS of a specific beam, the corresponding CSI-RS transmission can be switched off.

The location of CSI-RS in time and/or frequency may be seen as an example of transmission resource parameters for measurement signals.

Mobility between cells for WCDs is typically based on the WCD measuring the received signal quality of candidate cells. Based on an event (e.g., that another cell, or a beam of another cell, is in some sense better than the serving cell) the WCD reports the channel qualities of the cells, indicating that a handover may be beneficial. In long term evolution (LTE) systems, the measurements are performed on the cell reference symbols (CRS) that always are available. In NR, the measurements will be performed on either the primary/secondary synchronization symbols (PSS/SSS) or on the CSI-RS when they are configured.

The mobility in connected (active) mode is based on measurement reports. They are typically sent from the WCD to the network node (e.g., base station) where they are received by Layer 3; radio resource control (RRC). RRC handles the connected mode mobility by filtering the reports and comparing the signal strength (or other quality metric) from the visible cells. If a non-serving cell is better than the serving cell, the network moves the WCD (handover) so that it has the best cell as serving cell.

Thus, connected mode mobility between cells requires signaling over RRC, which means that signaling between the WCD (e.g., UE) and the network (e.g., gNB) is required to move the WCD from one cell to another. This signaling increases the load of the network and increases the delay for a handover, which can be critical in some situations (e.g., when a sudden degradation of the signal strength of the serving cell occurs due to that the user moves around corner, is obstructed by vehicle, or similar). The probability of such situations increases when the network operates in high frequency bands.

Furthermore, to be able to read the data on the physical downlink control channel (PDCCH) of a target cell—which is necessary to be able to receive data and be controlled from the target cell—the synchronization channels, PSS/SSS, need to be read since the physical cell identity (ID) is transmitted with the synchronization channels in LTE.

Therefore, there is a need for alternative approaches to handover control. Preferably such approaches are improved in some sense compared to existing approaches, e.g., in terms of one or more of: higher flexibility, increased robustness, less overhead signaling, and lower handover latency.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Generally, when an arrangement is referred to herein, it is to be understood as a physical product; e.g., an apparatus. The physical product may comprise one or more parts, such as controlling circuitry in the form of one or more controllers, one or more processors, or the like.

It is an object of some embodiments to solve or mitigate, alleviate, or eliminate at least some of the above or other disadvantages.

According to a first aspect, this is achieved by a handover control method for a wireless communication device (WCD) connected to a serving network node (SNWN) of a wireless communication network, wherein the SNWN provides a serving cell.

The method comprises establishing a handover control configuration shared by the WCD and the SNWN. The handover control configuration comprises a neighboring cell measurement triggering criterion, a handover triggering criterion, and transmission resource parameters for measurement signals of a neighboring cell provided by a neighboring network node (NNWN) of the wireless communication network.

The method also comprises performing—on measurement signals of the serving cell—channel quality measurements of the serving cell, transmitting—to the SNWN—a serving cell measurement report indicative of the channel quality measurements of the serving cell, and detecting fulfillment of the neighboring cell measurement triggering criterion of the handover control configuration based on the channel quality measurements of the serving cell.

The method also comprises performing—on measurement signals of the neighboring cell—channel quality measurements of the neighboring cell responsive to the detection of fulfillment of the neighboring cell measurement triggering criterion and according to the transmission resource parameters of the handover control configuration, transmitting—to the SNWN—a neighboring cell measurement report indicative of the channel quality measurements of the neighboring cell, and detecting fulfillment of the handover triggering criterion of the handover control configuration based on the channel quality measurements of the neighboring cell.

In some embodiments, establishing the handover control configuration shared by the WCD and the SNWN comprises receiving—from the SNWN—a configuration signal indicative of the handover control configuration.

In some embodiments, the method further comprises receiving—from the SNWN—an indication of time synchronization mismatch between the serving cell and the neighboring cell, and compensating for the time synchronization mismatch to enable the performance of channel quality measurements of the neighboring cell.

In some embodiments, the method further comprises performing handover to the neighboring cell responsive to the detection of fulfillment of the handover triggering criterion, wherein the handover excludes further signaling between the SNWN and the WCD.

A second aspect is a handover control method for a network node (SNWN) of a wireless communication network, wherein the SNWN is connected to a wireless communication device (WCD) and provides a serving cell of the WCD.

The method comprises establishing a handover control configuration shared by the WCD and the SNWN. The handover control configuration comprises a neighboring cell measurement triggering criterion, a handover triggering criterion, and transmission resource parameters for measurement signals of a neighboring cell provided by a neighboring network node (NNWN) of the wireless communication network.

The method also comprises receiving—from the WCD—a serving cell measurement report indicative of channel quality measurements of the serving cell performed by the WCD, and detecting fulfillment of the neighboring cell measurement triggering criterion of the handover control configuration based on the channel quality measurements of the serving cell.

The method also comprises issuing—for the NNWN and responsive to the detection of fulfillment of the neighboring cell measurement triggering criterion—a triggering signal for triggering transmission of the measurement signals of the neighboring cell according to the transmission resource parameters of the handover control configuration.

The method also comprises receiving—from the WCD—a neighboring cell measurement report indicative of channel quality measurements of the neighboring cell, and detecting fulfillment of the handover triggering criterion of the handover control configuration based on the channel quality measurements of the neighboring cell.

In some embodiments, establishing the handover control configuration shared by the WCD and the SNWN comprises transmitting—to the WCD—a configuration signal indicative of the handover control configuration.

In some embodiments, the method further comprises transmitting—to the WCD—an indication of time synchronization mismatch between the serving cell and the neighboring cell.

In some embodiments, the method further comprises performing handover of the WCD to the neighboring cell responsive to the detection of fulfillment of the handover triggering criterion, wherein the handover excludes further signaling between the SNWN and the WCD.

In some embodiments according to the first and/or second aspect, the handover triggering criterion of the handover control configuration comprises a neighboring cell channel quality threshold value, and the handover triggering criterion is fulfilled when the channel quality measurements of the neighboring cell falls above the neighboring cell channel quality threshold value.

In some embodiments according to the first and/or second aspect, the neighboring cell measurement triggering criterion of the handover control configuration comprises a serving cell channel quality threshold value, and the neighboring cell measurement triggering criterion is fulfilled when the channel quality measurements of the serving cell falls below the serving cell channel quality threshold value.

In some embodiments according to the first and/or second aspect, the transmission resource parameters of the handover control configuration for measurement signals of the neighboring cell comprise one or more of: time-frequency resource allocation of the measurement signals of the neighboring cell and active-inactive time pattern of the measurement signals of the neighboring cell.

In some embodiments according to the first and/or second aspect, the transmission resource parameters of the handover control configuration for measurement signals of the neighboring cell coincide with transmission resource parameters for measurement signals of the serving cell.

In some embodiments according to the first and/or second aspect, the measurement signals are channel state information reference signals (CSI-RS), the channel quality measurements are channel quality indicator (CQI) measurements, and the serving cell measurement report is a channel state information (CSI) report.

A third aspect is a handover control method for a neighboring network node (NNWN) of a wireless communication network. The NNWN provides a neighboring cell, which is neighboring to a serving cell of a wireless communication device (WCD), the serving cell being provided by a serving network node (SNWN) of the wireless communication network. A handover control configuration that is shared by the WCD and the SNWN comprises a neighboring cell measurement triggering criterion, a handover triggering criterion, and transmission resource parameters for measurement signals of the neighboring cell.

The method comprises detecting of a triggering signal—issued from the SNWN—for triggering transmission of the measurement signals according to the transmission resource parameters of the handover control configuration, and initiating transmission of the measurement signals of the neighboring cell responsive to detection of the triggering signal and according to the transmission resource parameters for measurement signals of a neighboring cell.

In some embodiments, the initiation of the transmission of the measurement signals comprises determining whether a traffic load of the neighboring cell fulfills an admittance criterion for the WCD, and transmitting the measurement signals when the admittance criterion is fulfilled.

In some embodiments, the method further comprises refraining from transmitting the measurement signals when the admittance criterion is not fulfilled.

A forth aspect is a computer program product comprising a non-transitory computer readable medium, having thereon a computer program comprising program instructions. The computer program is loadable into a data processing unit and configured to cause execution of the method according to any of the first, second and third aspects when the computer program is run by the data processing unit.

A fifth aspect is a handover control arrangement for a wireless communication device (WCD) connectable to a serving network node (SNWN) of a wireless communication network, wherein the SNWN is configured to provide a serving cell.

The arrangement comprises controlling circuitry configured to cause establishment of a handover control configuration shared by the WCD and the SNWN. The handover control configuration comprises a neighboring cell measurement triggering criterion, a handover triggering criterion, and transmission resource parameters for measurement signals of a neighboring cell provided by a neighboring network node (NNWN) of the wireless communication network.

The controlling circuitry is also configured to cause performance—on measurement signals of the serving cell—of channel quality measurements of the serving cell, transmission—to the SNWN—of a serving cell measurement report indicative of the channel quality measurements of the serving cell, and detection of fulfillment of the neighboring cell measurement triggering criterion of the handover control configuration based on the channel quality measurements of the serving cell.

The controlling circuitry is also configured to cause performance—on measurement signals of the neighboring cell—of channel quality measurements of the neighboring cell responsive to the detection of fulfillment of the neighboring cell measurement triggering criterion and according to the transmission resource parameters of the handover control configuration, transmission—to the SNWN—of a neighboring cell measurement report indicative of the channel quality measurements of the neighboring cell, and detection of fulfillment of the handover triggering criterion of the handover control configuration based on the channel quality measurements of the neighboring cell.

A sixth aspect is a handover control arrangement for a network node (SNWN) of a wireless communication network, wherein the SNWN is connectable to a wireless communication device (WCD) and configured to provide a serving cell of the WCD.

The arrangement comprises controlling circuitry configured to cause establishment of a handover control configuration shared by the WCD and the SNWN. The handover control configuration comprises a neighboring cell measurement triggering criterion, a handover triggering criterion, and transmission resource parameters for measurement signals of a neighboring cell provided by a neighboring network node (NNWN) of the wireless communication network.

The controlling circuitry is also configured to cause reception—from the WCD—of a serving cell measurement report indicative of channel quality measurements of the serving cell performed by the WCD, detection of fulfillment of the neighboring cell measurement triggering criterion of the handover control configuration based on the channel quality measurements of the serving cell, and issuance—for the NNWN and responsive to the detection of fulfillment of the neighboring cell measurement triggering criterion—of a triggering signal for triggering transmission of the measurement signals of the neighboring cell according to the transmission resource parameters of the handover control configuration.

The controlling circuitry is also configured to cause reception—from the WCD—of a neighboring cell measurement report indicative of channel quality measurements of the neighboring cell, and detection of fulfillment of the handover triggering criterion of the handover control configuration based on the channel quality measurements of the neighboring cell.

A seventh aspect is a handover control arrangement for a neighboring network node (NNWN) of a wireless communication network, wherein the NNWN is configured to provide a neighboring cell, which is neighboring to a serving cell of a wireless communication device (WCD), the serving cell being provided by a serving network node (SNWN) of the wireless communication network. A handover control configuration that is shared by the WCD and the SNWN comprises a neighboring cell measurement triggering criterion, a handover triggering criterion, and transmission resource parameters for measurement signals of the neighboring cell.

The arrangement comprises controlling circuitry configured to cause detection of a triggering signal—issued from the SNWN—for triggering transmission of the measurement signals according to the transmission resource parameters of the handover control configuration, and initiation of transmission of the measurement signals of the neighboring cell responsive to detection of the triggering signal and according to the transmission resource parameters for measurement signals of a neighboring cell.

An eighth aspect is a wireless communication device comprising the arrangement of the fifth aspect.

A ninth aspect is a network node comprising the arrangement of the sixth aspect and/or the arrangement of the seventh aspect.

In some embodiments, any of the above aspects may additionally have features identical with or corresponding to any of the various features as explained above for any of the other aspects.

An advantage of some embodiments is that an alternative approach to handover control is provided.

Another advantage of some embodiments is that handover control may be improved compared to existing approaches. For example, one or more of the following advantages may be achieved according to some embodiments: higher flexibility, increased robustness, less overhead signaling, and lower handover latency.

Yet an advantage of some embodiments is that the same reference symbols that are conventionally used for intra-cell mobility between beams may be used to enable the cell handover.

BRIEF DESCRIPTION OF THE DRAWINGS

Further objects, features and advantages will appear from the following detailed description of embodiments, with reference being made to the accompanying drawings. The drawings are not necessarily to scale, emphasis instead being placed upon illustrating the example embodiments.

FIG. 1 is a flowchart illustrating example method steps for a wireless communication device according to some embodiments;

FIG. 2 is a flowchart illustrating example method steps for a serving network node according to some embodiments;

FIG. 3 is a flowchart illustrating example method steps for a neighboring network node according to some embodiments;

DETAILED DESCRIPTION

Figure 4:
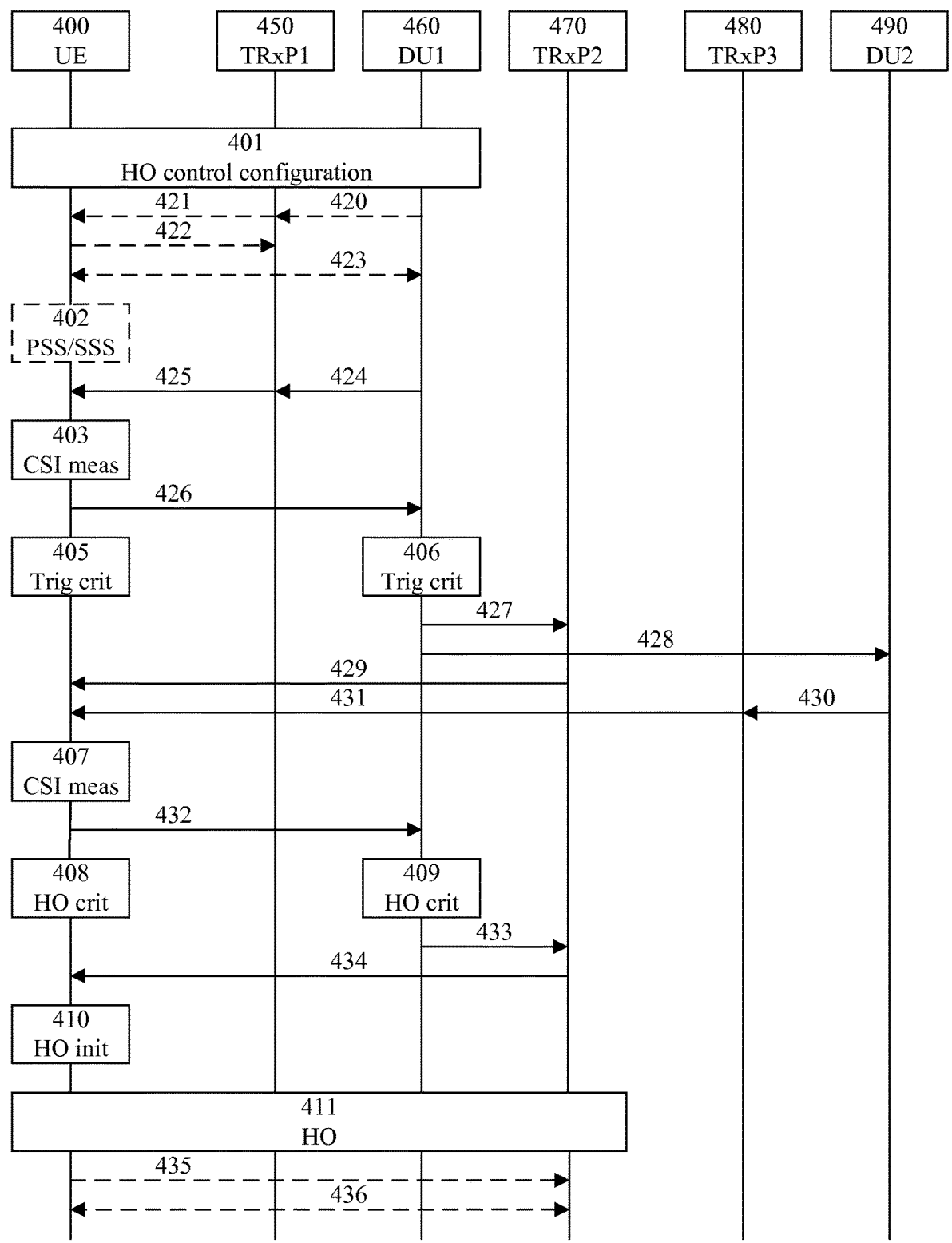
FIG. 4 is a combined flowchart and signaling diagram illustrating example method steps and signaling according to some embodiments.

As already mentioned above, it should be emphasized that the term "comprises/comprising" when used in this specification is taken to specify the presence of stated features, integers, steps, or components, but does not preclude the presence or addition of one or more other features, integers, steps, components, or groups thereof. As used herein, the singular forms "a", "an" and "the" are intended to include the plural forms as well, unless the context clearly indicates otherwise.

Embodiments of the present disclosure will be described and exemplified more fully hereinafter with reference to the accompanying drawings. The solutions disclosed herein can, however, be realized in many different forms and should not be construed as being limited to the embodiments set forth herein.

In the following, embodiments will be described where handover control is provided in the context of a wireless communication network, where a serving network node (SNWN) provides a serving cell of a wireless communication device (WCD) and a neighboring network node (NNWN) provides a neighboring cell, which is neighboring to the serving cell. Thus, the WCD is wirelessly connected/connectable to the SNWN.

The SNWN and the NNWN may be the same network node (providing both the serving cell and the neighboring cell), or the SNWN and the NNWN may be different network nodes.

FIGS. 1-3 illustrate respective example handover control methods 100, 200, 300 according to some embodiments. The example method 100 is for a WCD, the example method 200 is for a SNWN and the example method 300 is for a NNWN.

It is to be understood that a network node may be configured to perform the example method 200, may be configured to perform the example method 300, or may be configured to perform the example method 200 and the example method 300 (in the same execution instant or in different execution instants).

In steps 110 and 210, a handover (HO) control configuration shared by the WCD and the SNWN is established. The handover control configuration comprises a neighboring cell measurement triggering criterion, a handover triggering criterion, and transmission resource parameters for measurement signals of the neighboring cell. Steps 110 and 210 may, for example, be performed at connection set-up and/or performed or updated during an active connection.

The transmission resource parameters for measurement signals of the neighboring cell comprise a time-frequency resource allocation of the measurement signals of the neighboring cell and/or an active-inactive time pattern of the measurement signals of the neighboring cell.

In some embodiments, the transmission resource parameters for measurement signals of the neighboring cell coincide with transmission resource parameters for measurement signals of the serving cell.

Generally, establishment of the handover control configuration may be accomplished in any suitable way. For example, the establishment may be controlled from the SNWN and instituted at the WCD. In some embodiments, establishing the handover control configuration shared by the WCD and the SNWN comprises the SNWN transmitting a configuration signal to the WCD, and the WCD receiving the configuration signal from the SNWN, wherein the configuration signal is indicative of the handover control configuration.

In step 120, the WCD performs channel quality measurements on measurement signals of the serving cell. The channel measurements may be any suitable measurements, e.g., signal strength measurements or signal-to-interference ratio (SIR) measurements.

In step 130, the WCD transmits a serving cell measurement report indicative of the channel quality measurements of the serving cell to the SNWN, which receives the serving cell measurement report in step 230. The serving cell measurement report is for detection, at the SNWN, of fulfillment of the neighboring cell measurement triggering criterion of the handover control configuration.

In steps 140 and 240, the WCD and the SNWN, respectively, detect (i.e., determine) fulfillment of the neighboring cell measurement triggering criterion of the handover control configuration based on the channel quality measurements of the serving cell.

The neighboring cell measurement triggering criterion may, for example, concern the signal strength or the SIR of the serving cell dropping below some static or dynamic neighboring cell measurement triggering threshold value.

For example, the neighboring cell measurement triggering criterion of the handover control configuration may comprise a serving cell channel quality threshold value, and the neighboring cell measurement triggering criterion may be considered fulfilled when the channel quality measurements of the serving cell falls below the serving cell channel quality threshold value.

Notably, the detection of fulfillment of the neighboring cell measurement triggering criterion is done by both the WCD in step 140 and the SNWN in step 340, which is enabled by the shared handover control configuration defining the neighboring cell measurement triggering criterion. This makes signaling from the WCD to the SNWN to indicate that the WCD might benefit from neighboring cell measurements unnecessary.

In step 250, the SNWN issues (for the NNWN and responsive to the detection in step 240 of fulfillment of the neighboring cell measurement triggering criterion) a triggering signal for triggering transmission of the measurement signals of the neighboring cell according to the transmission resource parameters of the handover control configuration. The triggering signal is detected by the NNWN in step 350.

In some embodiments (e.g., when the SNWN and the NNWN are different network nodes), the issuance of step 250 may comprise transmitting the triggering signal towards the NNWN, and the detection of step 350 may comprise receiving the triggering signal from the SNWN. The transmission and reception of steps 250 and 350 may be via wired or wireless communication between the SNWN and the NNWN, as applicable.

In some embodiments (e.g., when the SNWN and the NNWN are the same network node), steps 250 and 350 may just involve the triggering signal being generated and detected within circuitry of the network node.

Responsive to detection of the triggering signal, the NNWN initiates, in step 360, transmission of the measurement signals of the neighboring cell according to the transmission resource parameters for measurement signals of a neighboring cell.

In step 160 and responsive to the detection of fulfillment of the neighboring cell measurement triggering criterion, the WCD performs channel quality measurements on the measurement signals of the neighboring cell according to the transmission resource parameters of the handover control configuration. The channel measurements may be any suitable measurements, e.g., signal strength measurements or SIR measurements.

Notably, due to that the transmission resource parameters are known to both the WCD and the SNWN via the shared handover control configuration, the WCD typically does not need to perform any particular search or detection steps in relation to the neighboring cell at this point of the process, but can typically start channel quality measurements directly responsive to the detection of step 140.

In some embodiments, the WCD may need to search for the cell; e.g., depending on whether or not the cells are collocated and/or well synchronized. The WCD may be informed of the timing of the neighboring cell from the serving network node. Alternatively or additionally, the WCD may perform a search to establish sufficiently accurate timing. A search by the WCD to establish timing of a neighboring cell may be done based on the reference symbols that are used for the quality measurement. When the cells are unsynchronized, the WCD typically needs to look for the synchronization signals before starting the measurements.

In step 170, the WCD transmits a neighboring cell measurement report indicative of the channel quality measurements of the neighboring cell to the SNWN, which receives the neighboring cell measurement report in step 270. The neighboring cell measurement report is for detection, at the SNWN, of fulfillment of the handover triggering criterion of the handover control configuration.

In steps 180 and 280, the WCD and the SNWN, respectively, detect (i.e., determine) fulfillment of the handover triggering criterion of the handover control configuration based on the channel quality measurements of the neighboring cell (and possibly also based on the channel quality measurements of the serving cell).

The handover triggering criterion may, for example, concern the signal strength or the SIR of the neighboring cell being higher than some static or dynamic handover triggering threshold value, or any other suitable criterion (e.g., related to a ratio between the signal strength of the serving and the neighboring cell).

For example, the handover triggering criterion of the handover control configuration may comprise a neighboring cell channel quality threshold value, and the handover triggering criterion may be considered fulfilled when the channel quality measurements of the neighboring cell falls above the neighboring cell channel quality threshold value.

Notably, the detection of fulfillment of the handover triggering criterion is done by both the WCD in step 180 and the SNWN in step 380, which is enabled by the shared handover control configuration defining the handover triggering criterion. This makes signaling from the WCD to the SNWN to indicate that the WCD might benefit from handover unnecessary.

Responsive to the detection of fulfillment of the handover triggering criterion, handover of the WCD to the neighboring cell may be performed as illustrated in steps 190, 290 and 390. Notably, since the detection of fulfillment of the handover triggering criterion takes place in both the WCD and the SNWN, the handover excludes further signaling between the SNWN and the WCD.

The measurement signals used for the measurements in steps 120 and/or 160 may, for example, be channel state information reference signals (CSI-RS). The channel quality measurements in steps 120 and/or 160 may, for example, be channel quality indicator (CQI) measurements. The serving cell measurement report of steps 130 and 230, may, for example, be a channel state information (CSI) report, a CQI report, or a RRC report.

In some embodiments, the respective time synchronizations of the SNWN and the NNWN may be un-matched. In such situations, the SNWN may transmit an indication of the time synchronization mismatch between the serving cell and the neighboring cell, which indication is received by the WCD. These actions may, for example, be part of the steps 110 and 120.

Having received the indication of the time synchronization mismatch between the serving cell and the neighboring cell, the WCD may compensate for the time synchronization mismatch to enable the performance of channel quality measurements of the neighboring cell in step 160.

Thus, the indication of the time synchronization mismatch may be used for detecting the neighboring cell. Additionally, the indication of the time synchronization mismatch may also be used in association with the handover of step 190. For example, the indication of the time synchronization mismatch may be used, together with the timing advance of the serving cell, to estimate uplink timing. Thus, the indication of the time synchronization mismatch may be useful when starting uplink transmission with timing advance to the neighboring (now serving) cell, where timing precision may be of essence.

In some embodiments, the NNWN determines, in associations with—e.g., before or during—step 360, whether a traffic load of the neighboring cell fulfills an admittance criterion for the WCD.

For example, the admittance criterion may comprise a (static or dynamic; relative or absolute) traffic load threshold value, and the admittance criterion may be considered fulfilled when the traffic load falls below the traffic load threshold value.

When the admittance criterion is fulfilled, the NNWN may perform the transmission of the measurement signals in step 360. When the admittance criterion is not fulfilled, the NNWN may refrain from transmitting the measurement signals in step 360. Refraining from transmission may comprise not starting transmission or aborting already started transmission.

In some embodiments, the NNWN determines, in associations with—e.g., before or during—step 390, whether a traffic load of the neighboring cell fulfills an admittance criterion for the WCD.

When the admittance criterion is fulfilled, the NNWN may perform the handover in step 390. When the admittance criterion is not fulfilled, the NNWN may refrain from performing the handover in step 390. Refraining from performing may comprise not accepting handover from SNWN or transferring an already handed over WCD back to the SNWN.

FIG. 4 is a combined flowchart and signaling diagram illustrating example method steps and signaling according to some embodiments. The signaling diagram shows a WCD in the form of a user equipment (UE) 400, and a SNWN in the form of a combination of a first transmit/receive point (TRxP1) 450 and a first distributed unit (DU1) 460. The signaling diagram also shows two different NNWN; the first NNWN in the form of a combination of a second transmit/receive point (TRxP2) 460 and the first distributed unit (DU1) 460, the second NNWN in the form of a combination of a third transmit/receive point (TRxP3) 480 and a second distributed unit (DU2) 490.

401 shows that a shared HO control configuration is established between the WCD and the SNWN (compare with steps 110 and 210). 401 may, for example, be performed at connection setup between the WCD and the SNWN. The operations of 401 may comprise initial CSI-RS allocation for neighboring TRxPs as an example of transmission resource parameters for measurement signals of the neighboring cell. The operations of 401 may also comprise making both UE and DU1 aware of thresholds for triggering neighboring cell measurements and for triggering handover. The handover control configuration may be provided to UE over RRC.

Some common actions that may be performed during operation, but which are not necessarily part of the solutions described herein, are illustrated by dashed arrows and boxes as follows. The physical downlink control channel (PDCCH) of TRxP1 is provided from DU1 to UE via TRxP1 as illustrated by 420 and 421, and the UE responds to the TRxP1 with demodulation reference signal (DMRS) and sounding reference signal (SRS) as illustrated by 422. The sounding reference signal is an uplink reference signal that is always transmitted as configured; it does not depend on transmitted data. User data using a flexible scrambling code is communicated over a physical downlink shared channel (PDSCH) as illustrated by 423. The UE may perform continuous neighbor PSS/SSS measurements as illustrated at 402.

Measurements signals (e.g. CSI-RS) are transmitted by the DU1 via TRxP1 as illustrated by 424, 425. The UE performs channel quality measurements (e.g. measurements on the CSI-RS, CSI meas) as illustrated by 403 (compare with step 120).

A report indicative of the channel quality measurements (e.g., a CSI-RS report on layer two, L2) is transmitted by the UE to the DU1 as illustrated by 426 (compare with steps 130 and 230).

Fulfillment of the neighboring cell measurement triggering criterion (trig crit) is detected by both the UE and the DU1 as illustrated by 405 and 406 (compare with steps 140 and 240). The criterion may, for example, comprise the quality according to the CSI-RS being lower than a threshold value.

Responsive to the detection in 406, the DU1 issues a triggering signal 427 (e.g., initiation of a second CSI-RS) which is detected by the TRxP2 (compare with steps 250 and 350).

Also responsive to the detection in 406, the DU1 issues a triggering signal 428 (e.g., a CSI-RS request), which is transmitted to the DU2 (compare with step 250). In response thereto, the DU2 sends a triggering signal 430 (e.g., initiation of a CSI-RS) which is detected by the TRxP3 (compare with step 350).

TRxP2 and TRxP3 initiates transmission of measurement signals 429 and 431 (e.g. CSI-RS) and the UE performs channel quality measurements (e.g. measurements on the CSI-RS, CSI meas) thereon responsive to the detection in 405 as illustrated by 407 (compare with steps 360 and 160).

A report indicative of the channel quality measurements (e.g., a CSI-RS report on layer two, L2) is transmitted by the UE to the DU1 as illustrated by 432 (compare with steps 170 and 270). 432 may be a single report of one report per measured cell.

Fulfillment of the handover criterion (HO crit) is detected by both the UE and the DU1 as illustrated by 408 and 409 (compare with steps 180 and 280). These steps may also comprise determining a best cell (say TRxP2 in this example).

Responsive to the detection in 409, the DU1 transmits handover signaling to TRxP2 as illustrated by 433 (compare with steps 290 and 390), and the TRxP2 then start transmitting PDCCH to the UE as illustrated by 434.

Responsive to the detection in 408, the UE initiates the handover (HO init) as illustrated by 410 (compare with step 190). Notably, no handover signaling is present between the UE and the TRxP1 or the DU1 after the detections in 408 and 409.

The UE does not need to detect PSS/SSS for TRxP2. The UE has already measured CSI-RS of TRxP2, so it is synchronized with TRxP2. Furthermore, the handover parameters may typically be signalled in advance. Thus, the UE may initiate handover as illustrated by 410 and, as part of the handover 411, the UE starts synchronizing to the neighboring cell and receives its control channel 434. The UE responds to the TRxP2 with demodulation reference signal (DMRS) and sounding reference signal (SRS) as illustrated by 435, in order to thereafter start receiving data from the neighboring cell (new serving cell) as illustrated by 436.

Figure 5:
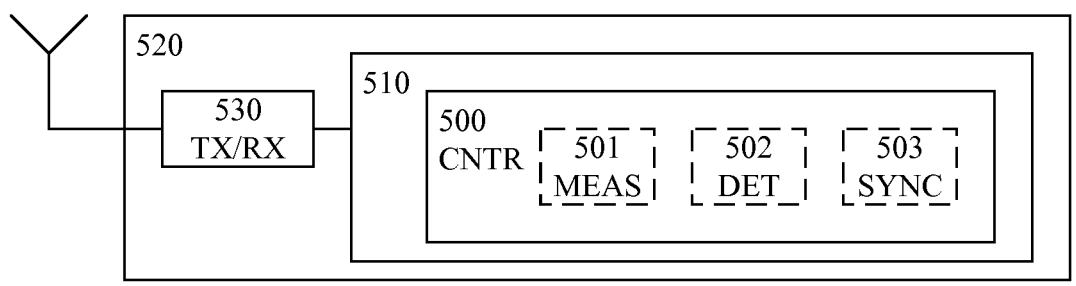
FIG. 5 is a schematic block diagram illustrating an example arrangement for a wireless communication device according to some embodiments.
Figure 6:
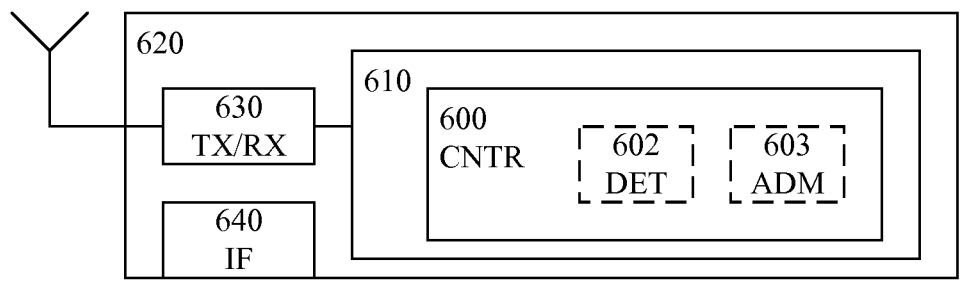
FIG. 6 is a schematic block diagram illustrating an example arrangement for a network node according to some embodiments.

FIGS. 5 and 6 schematically illustrate example arrangements 510 (for a wireless communication device 520) and 610 (for a network node 620) according to some embodiments. The arrangement 510 may be adapted to cause execution of the method as described in connection to FIG. 1. The arrangement 610 may be adapted to cause execution of any or both of the methods as described in connection to FIGS. 2 and 3.

As mentioned before, when an arrangement is referred to herein, it is to be understood as a physical product; e.g., an apparatus. The physical product may comprise one or more parts, such as controlling circuitry in the form of one or more controllers, one or more processors, or the like.

The arrangements of FIGS. 5 and 6 are for handover control in the context of a wireless communication network, where a serving network node (SNWN, e.g., 620) provides a serving cell of a wireless communication device (WCD, e.g., 520) and a neighboring network node (NNWN, e.g., 620—the same or different from SNWN) provides a neighboring cell, which is neighboring to the serving cell.

The arrangement 510 comprises controlling circuitry (CNTR) 500 configured to cause establishment of a handover control configuration shared by the WCD and the SNWN (compare with step 110).

For example, the controlling circuitry may be configured to cause the establishment of the handover control configuration by causing reception of a configuration signal indicative of the handover control configuration. To this end the controlling circuitry may be associated with receiving circuitry (e.g. a receiver, depicted as part of a transceiver, TX/RX, 530 in FIG. 5), which may or may not be comprised in the arrangement 510. The receiving circuitry may be configured to receive the configuration signal.

The controlling circuitry 500 is also configured to cause performance of channel quality measurements of the serving cell and the neighboring cell (compare with steps 120 and 160). To this end the controlling circuitry may comprise or be otherwise associated with measurement circuitry (MEAS) 501, which may or may not be comprised in the arrangement 510. The measurement circuitry may be configured to perform the channel quality measurements.

The controlling circuitry 500 is also configured to cause transmission of measurement reports to the SNWN corresponding to the performed channel quality measurements (compare with steps 130 and 170). To this end the controlling circuitry may be associated with transmitting circuitry (e.g. a transmitter, depicted as part of the transceiver, TX/RX, 530 in FIG. 5), which may or may not be comprised in the arrangement 510. The transmitting circuitry may be configured to transmit the measurement reports.

The controlling circuitry 500 is also configured to cause detection of fulfillment of the neighboring cell measurement triggering criterion and of the handover triggering criterion (compare with steps 140 and 180). To this end the controlling circuitry may comprise or be otherwise associated with detection circuitry (DET) 502, which may or may not be comprised in the arrangement 510. The detection circuitry may be configured to detect fulfillment of the criteria.

The controlling circuitry 500 may also be configured to cause handover to the neighboring cell (compare with step 190).

The controlling circuitry 500 may also be configured to cause compensation for a time synchronization mismatch to enable the performance of channel quality measurements of the neighboring cell. To this end the controlling circuitry may comprise or be otherwise associated with synchronization circuitry (SYNC) 503, which may or may not be comprised in the arrangement 510. The synchronization circuitry may be configured to perform that compensation.

The arrangement 610 comprises controlling circuitry (CNTR) 600. When acting for a SNWN, the controlling circuitry is configured to cause establishment of a handover control configuration shared by the WCD and the SNWN (compare with step 210).

For example, the controlling circuitry may be configured to cause the establishment of the handover control configuration by causing transmission of a configuration signal indicative of the handover control configuration. To this end the controlling circuitry may be associated with transmitting circuitry (e.g. a transmitter, depicted as part of a transceiver, TX/RX, 630 in FIG. 6), which may or may not be comprised in the arrangement 610. The transmitting circuitry may be configured to transmit the configuration signal.

The controlling circuitry 600 is also configured to cause reception of measurement reports from the WCD corresponding to channel quality measurements performed by the WCD (compare with steps 230 and 270). To this end the controlling circuitry may be associated with receiving circuitry (e.g. a receiver, depicted as part of the transceiver, TX/RX, 630 in FIG. 6), which may or may not be comprised in the arrangement 610. The receiving circuitry may be configured to receive the measurement reports.

The controlling circuitry 600 is also configured to cause detection of fulfillment of the neighboring cell measurement triggering criterion and of the handover triggering criterion (compare with steps 240 and 280). To this end the controlling circuitry may comprise or be otherwise associated with detection circuitry (DET) 602, which may or may not be comprised in the arrangement 610. The detection circuitry may be configured to detect fulfillment of the criteria.

The controlling circuitry 600 may also be configured to cause issuance of a triggering signal for triggering transmission of the measurement signals of the neighboring cell (compare with step 250). To this end the controlling circuitry may be associated with interface circuitry (IF) 640, which may or may not be comprised in the arrangement 610. The interface circuitry may be configured to transmit and/or transfer the triggering signal to the NNWN.

The controlling circuitry 600 may also be configured to cause handover to the neighboring cell (compare with step 290).

When acting for a SNWN, the controlling circuitry 600 is configured to cause detection of a triggering signal for triggering transmission of the measurement signals (compare with step 350) and initiation of transmission of the measurement signals responsive to the detection (compare with step 360).

The controlling circuitry 600 may also be configured to cause determination of whether a traffic load of the neighboring cell fulfills an admittance criterion for the WCD and either transmit the measurement signals or refrain from transmission in response to the determination. To this end the controlling circuitry may comprise or be otherwise associated with admitting circuitry (ADM) 603, which may or may not be comprised in the arrangement 610. The admitting circuitry may be configured to monitor the traffic load and make decisions regarding admittance of further WCDs into the cell.

Thus, according to some embodiments presented herein, approaches to active mode mobility are provided with reduced signaling.

An advantage of some embodiments is that they enable fast mobility between cells; in particular between cells sharing the same radio control. Another advantage of some embodiments is that they provide for reduced RRC signaling. The layer one and two (L1/L2) CSI reporting is used to enable the embodiments. Yet another advantage of some embodiments is that the handover can be made seamless.

According to some embodiments, the network is able to trigger a start of the CSI-RS transmission from the neighboring cell at the same time as the UE triggers the start of searching for new CSI-RS beams. The UE measurements start based on the same event that triggers the start of the CSI-RS transmissions in the neighboring cell. Since the same information, from the reports, is available in both the UE and in the network, the same event can be triggered in both the UE and in the network independently. Thereby, no further signaling is needed to start the measurements when the CSI-RS transmissions from beams in the neighboring cells are started. This makes the mobility more robust. Since the coverage of the UE is typically poor when the UE needs to move to another cell, the signaling shall be as limited as possible to not risk a bad mobility due to bad coverage.

In typical embodiments, parameters for the mobility control are thus required in both the UE and the network. The parameters for triggering the event as well as the parameters of the CSI-RS resource allocation of the neighbor cells that the UE shall measure on are needed. This is what is referred to above as handover control configuration. Optionally, parameters describing which neighboring cells are synchronous, and mismatch information for those that are not, may also be signaled to the UE when the configuration is established.

It is typically beneficial if the cells are synchronized in time since then, the positions of the CSI-RS symbols in the neighboring cells can be aligned with the positions of the CSI-RS symbols in the serving cell, and the positions in the CSI-RS raster (pattern) may be set to look the same as for other beams from the same cell. In case the cells are not synchronized, the UE must synchronize with the other cell. Signaling from the network to the UE may enable, of the time difference between cells, may enable synchronization with the CSI-RS symbols if the CSI-RS has support for time synchronization or, alternatively, synchronization with the SS-block (PSS and SSS).

In a similar manner as described above, the network is able to trigger a handover to the neighboring cell at the same time as the UE triggers the handover. The handover of the UE to the target cell can then be managed without RRC signaling as has been described above. An alternative handover procedure may be in accordance with the conventional RRC signaling for handover once the CSI-RS measurements trigger a handover (compare with steps 180 and 280).

Typically, signaling of measurement configurations and signaling in connection to handover delays the mobility. When the radio quality is poor, such delays may be critical. Furthermore, unnecessarily using capacity used for signaling is not preferable.

Advantages of various embodiments include improved mobility between cells by limiting the signaling, making the mobility more robust in bad coverage scenarios, and reducing the handover delay.

According to some embodiments, UE active mode handover procedure between two cells is provided, where the two cells are connected to the same central unit (CU) of a communication network. The radio control can be associated with either one DU or may be between two DUs (compare with DU1 and DU2 of FIG. 4). In this approach to handover, the data traffic from the User Plane in the CU can be directed to the target DU when the handover is handled between two DUs.

Figure 7:
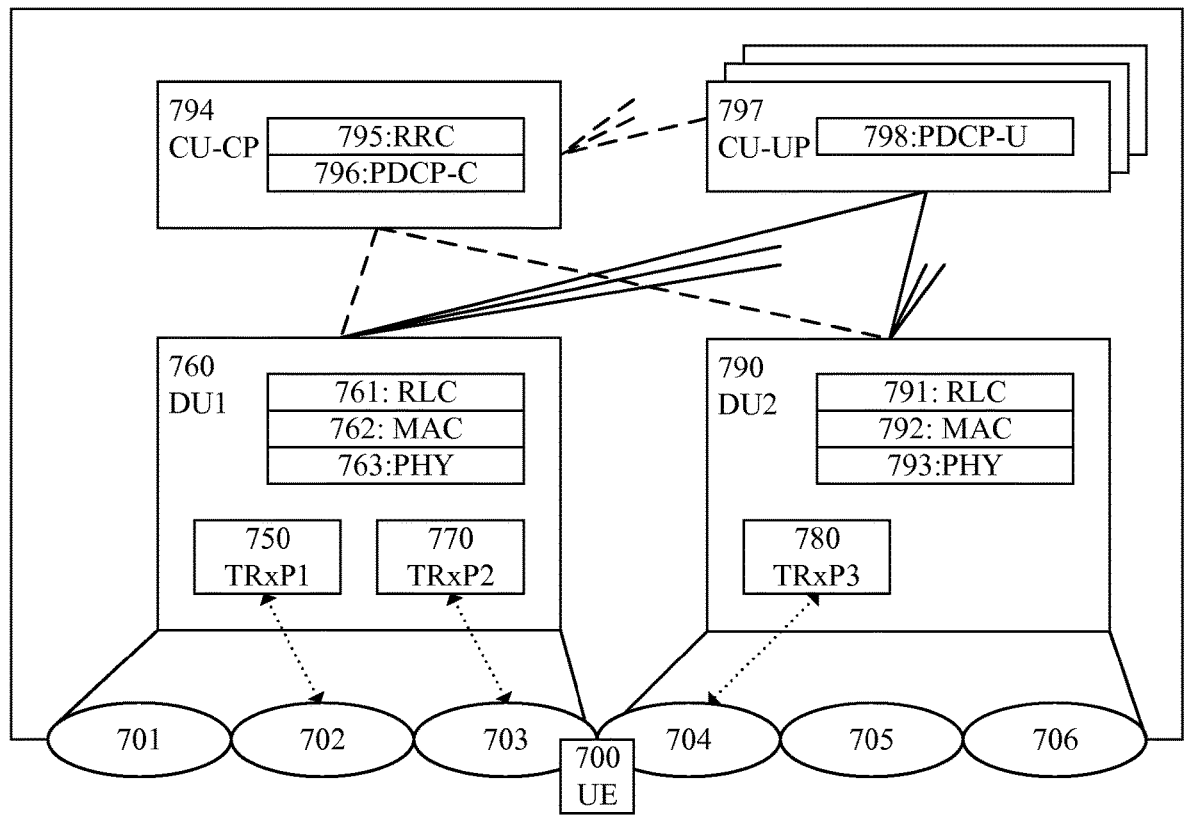
FIG. 7 is a schematic drawing illustrating an example cellular network scenario according to some embodiments.

FIG. 7 schematically illustrates an example cellular network scenario according to some embodiments.

In this figure, the Central Unit (CU) comprises the Control Plane (CU-CP) 794 with RRC layer 795 and control packet data convergence protocol layer (PDCP-C) 796, and the corresponding User Plane (CU-UP) 797 with user packet data convergence protocol layer (PDCP-U) 798.

The lower layers of the Distributed Units (DU1, DU2) 760, 790 are deployed in the base stations close to the radios (TRxP1, TRxP2, TRxP3) 750, 770, 780, and include radio link control (RLC) layer 761, 791, medium access control (MAC) layer 762, 792, and physical (PHY) layer 763, 793.

There are two DUs below the CU in FIG. 7 and six cells 701, 702, 703, 704, 705, 706 connected to the same CU with radio control. A UE 700 is also shown in a location where handover between cells 703 and 704 may be applicable.

The described embodiments and their equivalents may be realized in software or hardware or a combination thereof. The embodiments may be performed by general purpose circuitry. Examples of general purpose circuitry include digital signal processors (DSP), central processing units (CPU), co-processor units, field programmable gate arrays (FPGA) and other programmable hardware. Alternatively or additionally, the embodiments may be performed by specialized circuitry, such as application specific integrated circuits (ASIC). The general purpose circuitry and/or the specialized circuitry may, for example, be associated with or comprised in an apparatus such as a wireless communication device or a network node.

Embodiments may appear within an electronic apparatus (such as a wireless communication device or a network node) comprising arrangements, circuitry, and/or logic according to any of the embodiments described herein. Alternatively or additionally, an electronic apparatus (such as a wireless communication device or a network node) may be configured to perform methods according to any of the embodiments described herein.

Figure 8:
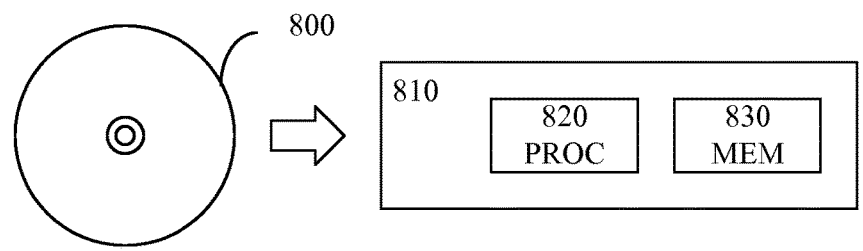
FIG. 8 is a schematic drawing illustrating an example computer readable medium according to some embodiments.

According to some embodiments, a computer program product comprises a computer readable medium such as, for example a universal serial bus (USB) memory, a plug-in card, an embedded drive or a read only memory (ROM). FIG. 8 illustrates an example computer readable medium in the form of a compact disc (CD) ROM 800. The computer readable medium has stored thereon a computer program comprising program instructions. The computer program is loadable into a data processor (PROC) 820, which may, for example, be comprised in a wireless communication device or a network node 810. When loaded into the data processing unit, the computer program may be stored in a memory (MEM) 830 associated with or comprised in the data-processing unit. According to some embodiments, the computer program may, when loaded into and run by the data processing unit, cause execution of method steps according to, for example, any of the methods illustrated in FIGS. 1-4 or otherwise described herein.

Figure 9:
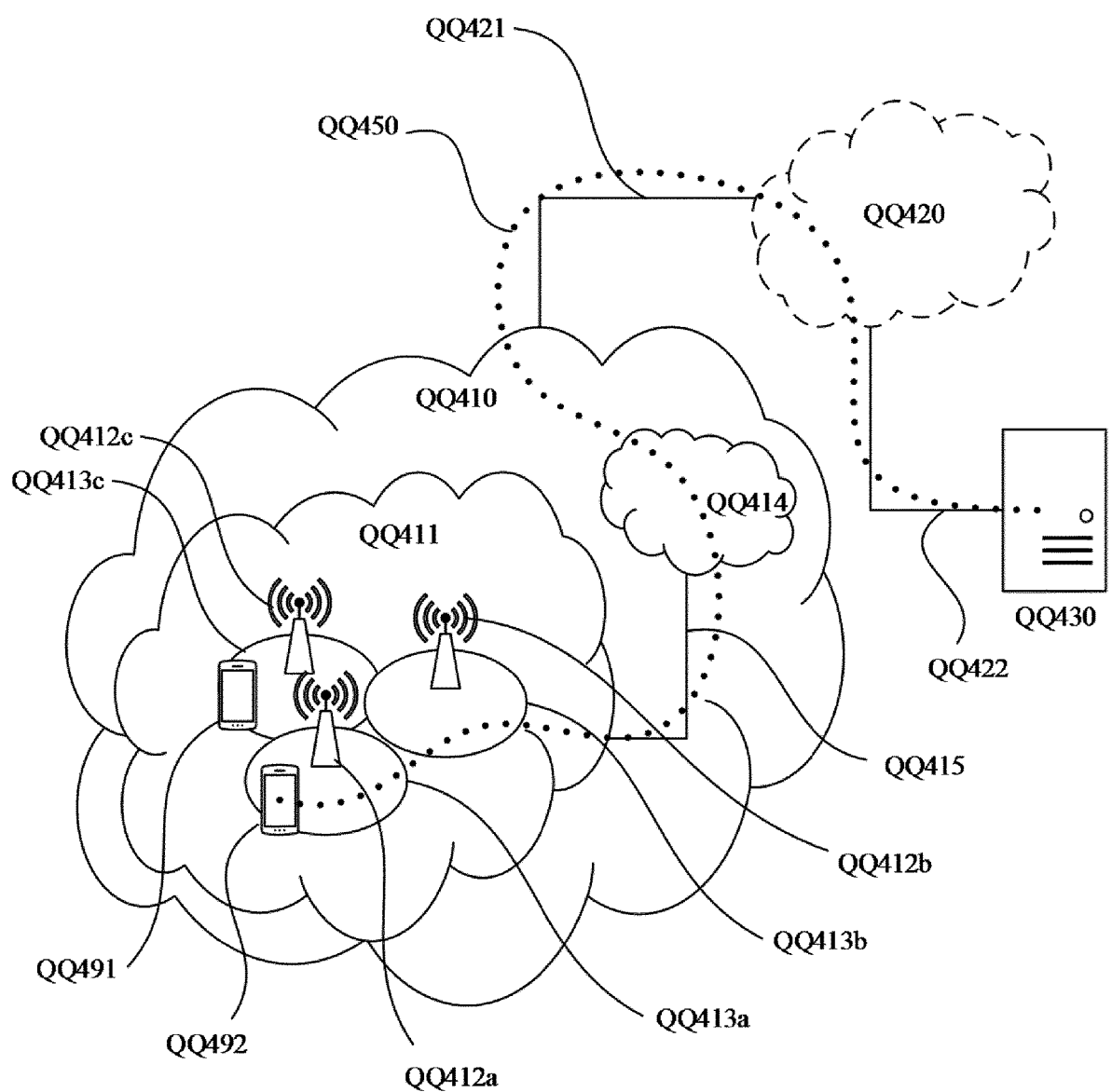
FIG. 9 illustrates a telecommunication network connected via an intermediate network to a host computer in accordance with some embodiments.

With reference to FIG. 9, in accordance with an embodiment, a communication system includes telecommunication network QQ410, such as a 3GPP-type cellular network, which comprises access network QQ411, such as a radio access network, and core network QQ414. Access network QQ411 comprises a plurality of base stations QQ412a, QQ412b, QQ412c, such as NBs, eNBs, gNBs or other types of wireless access points, each defining a corresponding coverage area QQ413a, QQ413b, QQ413c. Each base station QQ412a, QQ412b, QQ412c is connectable to core network QQ414 over a wired or wireless connection QQ415. A first UE QQ491 located in coverage area QQ413c is configured to wirelessly connect to, or be paged by, the corresponding base station QQ412c. A second UE QQ492 in coverage area QQ413a is wirelessly connectable to the corresponding base station QQ412a. While a plurality of UEs QQ491, QQ492 are illustrated in this example, the disclosed embodiments are equally applicable to a situation where a sole UE is in the coverage area or where a sole UE is connecting to the corresponding base station QQ412.

Telecommunication network QQ410 is itself connected to host computer QQ430, which may be embodied in the hardware and/or software of a standalone server, a cloud-implemented server, a distributed server or as processing resources in a server farm. Host computer QQ430 may be under the ownership or control of a service provider, or may be operated by the service provider or on behalf of the service provider. Connections QQ421 and QQ422 between telecommunication network QQ410 and host computer QQ430 may extend directly from core network QQ414 to host computer QQ430 or may go via an optional intermediate network QQ420. Intermediate network QQ420 may be one of, or a combination of more than one of, a public, private or hosted network; intermediate network QQ420, if any, may be a backbone network or the Internet; in particular, intermediate network QQ420 may comprise two or more sub-networks (not shown).

The communication system of FIG. 9 as a whole enables connectivity between the connected UEs QQ491, QQ492 and host computer QQ430. The connectivity may be described as an over-the-top (OTT) connection QQ450. Host computer QQ430 and the connected UEs QQ491, QQ492 are configured to communicate data and/or signaling via OTT connection QQ450, using access network QQ411, core network QQ414, any intermediate network QQ420 and possible further infrastructure (not shown) as intermediaries. OTT connection QQ450 may be transparent in the sense that the participating communication devices through which OTT connection QQ450 passes are unaware of routing of uplink and downlink communications. For example, base station QQ412 may not or need not be informed about the past routing of an incoming downlink communication with data originating from host computer QQ430 to be forwarded (e.g., handed over) to a connected UE QQ491. Similarly, base station QQ412 need not be aware of the future routing of an outgoing uplink communication originating from the UE QQ491 towards the host computer QQ430.

Example implementations, in accordance with an embodiment, of the UE, base station and host computer discussed in the preceding paragraphs will now be described with reference to FIG. 10. In communication system QQ500, host computer QQ510 comprises hardware QQ515 including communication interface QQ516 configured to set up and maintain a wired or wireless connection with an interface of a different communication device of communication system QQ500. Host computer QQ510 further comprises processing circuitry QQ518, which may have storage and/or processing capabilities. In particular, processing circuitry QQ518 may comprise one or more programmable processors, application-specific integrated circuits, field programmable gate arrays or combinations of these (not shown) adapted to execute instructions. Host computer QQ510 further comprises software QQ511, which is stored in or accessible by host computer QQ510 and executable by processing circuitry QQ518. Software QQ511 includes host application QQ512. Host application QQ512 may be operable to provide a service to a remote user, such as UE QQ530 connecting via OTT connection QQ550 terminating at UE QQ530 and host computer QQ510. In providing the service to the remote user, host application QQ512 may provide user data which is transmitted using OTT connection QQ550.

Communication system QQ500 further includes base station QQ520 provided in a telecommunication system and comprising hardware QQ525 enabling it to communicate with host computer QQ510 and with UE QQ530. Hardware QQ525 may include communication interface QQ526 for setting up and maintaining a wired or wireless connection with an interface of a different communication device of communication system QQ500, as well as radio interface QQ527 for setting up and maintaining at least wireless connection QQ570 with UE QQ530 located in a coverage area (not shown in FIG. 10) served by base station QQ520. Communication interface QQ526 may be configured to facilitate connection QQ560 to host computer QQ510. Connection QQ560 may be direct or it may pass through a core network (not shown in FIG. 10) of the telecommunication system and/or through one or more intermediate networks outside the telecommunication system. In the embodiment shown, hardware QQ525 of base station QQ520 further includes processing circuitry QQ528, which may comprise one or more programmable processors, application-specific integrated circuits, field programmable gate arrays or combinations of these (not shown) adapted to execute instructions. Base station QQ520 further has software QQ521 stored internally or accessible via an external connection.

Communication system QQ500 further includes UE QQ530 already referred to. Its hardware QQ535 may include radio interface QQ537 configured to set up and maintain wireless connection QQ570 with a base station serving a coverage area in which UE QQ530 is currently located. Hardware QQ535 of UE QQ530 further includes processing circuitry QQ538, which may comprise one or more programmable processors, application-specific integrated circuits, field programmable gate arrays or combinations of these (not shown) adapted to execute instructions. UE QQ530 further comprises software QQ531, which is stored in or accessible by UE QQ530 and executable by processing circuitry QQ538. Software QQ531 includes client application QQ532. Client application QQ532 may be operable to provide a service to a human or non-human user via UE QQ530, with the support of host computer QQ510. In host computer QQ510, an executing host application QQ512 may communicate with the executing client application QQ532 via OTT connection QQ550 terminating at UE QQ530 and host computer QQ510. In providing the service to the user, client application QQ532 may receive request data from host application QQ512 and provide user data in response to the request data. OTT connection QQ550 may transfer both the request data and the user data. Client application QQ532 may interact with the user to generate the user data that it provides.

Figure 10:
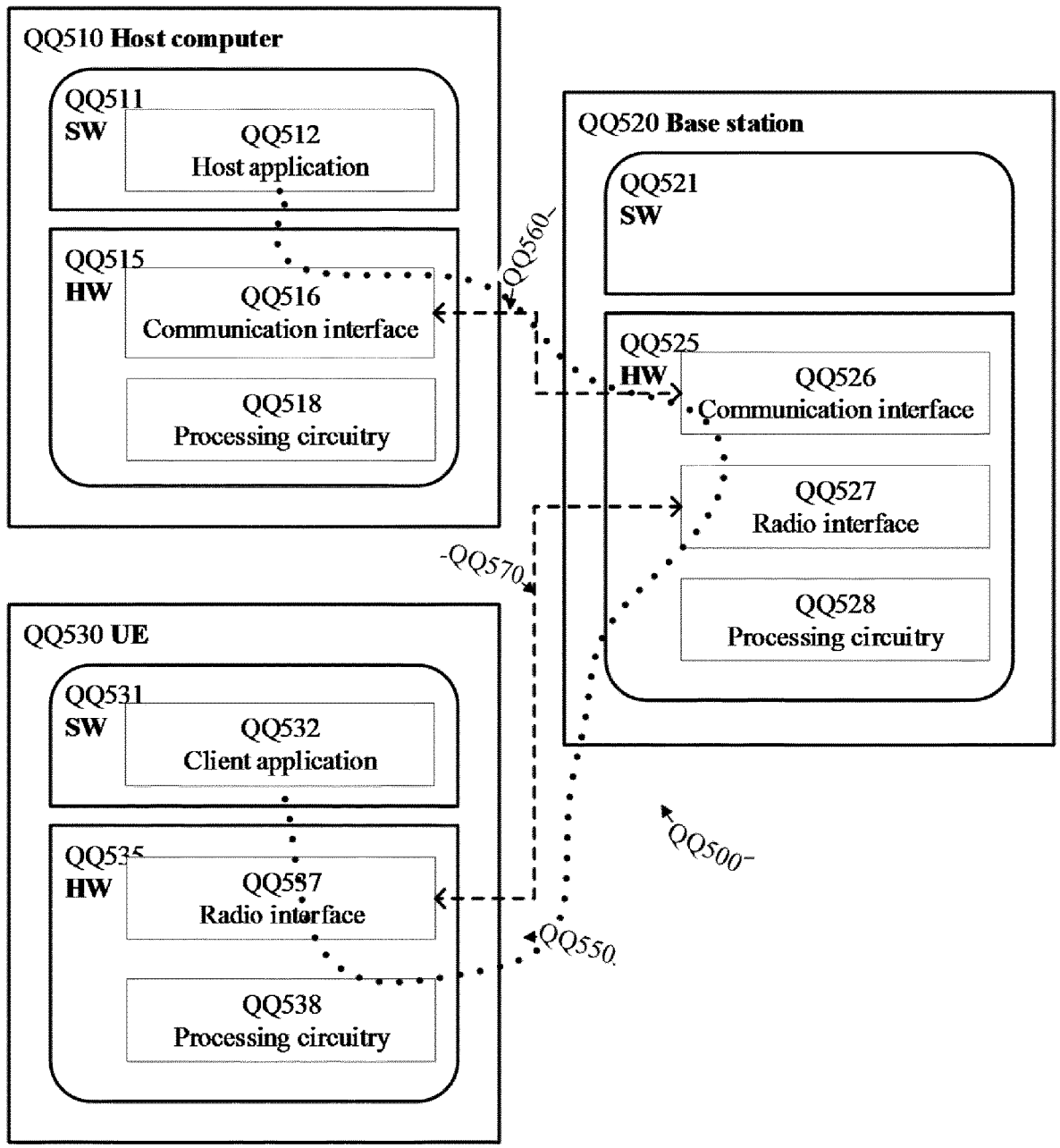
FIG. 10 illustrates a host computer communicating via a base station with a user equipment over a partially wireless connection in accordance with some embodiments.

It is noted that host computer QQ510, base station QQ520 and UE QQ530 illustrated in FIG. 10 may be similar or identical to host computer QQ430, one of base stations QQ412a, QQ412b, QQ412c and one of UEs QQ491, QQ492 of FIG. 9, respectively. This is to say, the inner workings of these entities may be as shown in FIG. 10 and independently, the surrounding network topology may be that of FIG. 9.

In FIG. 10, OTT connection QQ550 has been drawn abstractly to illustrate the communication between host computer QQ510 and UE QQ530 via base station QQ520, without explicit reference to any intermediary devices and the precise routing of messages via these devices. Network infrastructure may determine the routing, which it may be configured to hide from UE QQ530 or from the service provider operating host computer QQ510, or both. While OTT connection QQ550 is active, the network infrastructure may further take decisions by which it dynamically changes the routing (e.g., on the basis of load balancing consideration or reconfiguration of the network).

Wireless connection QQ570 between UE QQ530 and base station QQ520 is in accordance with the teachings of the embodiments described throughout this disclosure. One or more of the various embodiments improve the performance of OTT services provided to UE QQ530 using OTT connection QQ550, in which wireless connection QQ570 forms the last segment. More precisely, the teachings of these embodiments may improve handover control by achieving one or more of: higher flexibility, increased robustness, less overhead signaling, and lower handover latency and thereby provide benefits such as improved user experience.

A measurement procedure may be provided for the purpose of monitoring data rate, latency and other factors on which the one or more embodiments improve. There may further be an optional network functionality for reconfiguring OTT connection QQ550 between host computer QQ510 and UE QQ530, in response to variations in the measurement results. The measurement procedure and/or the network functionality for reconfiguring OTT connection QQ550 may be implemented in software QQ511 and hardware QQ515 of host computer QQ510 or in software QQ531 and hardware QQ535 of UE QQ530, or both. In embodiments, sensors (not shown) may be deployed in or in association with communication devices through which OTT connection QQ550 passes; the sensors may participate in the measurement procedure by supplying values of the monitored quantities exemplified above, or supplying values of other physical quantities from which software QQ511, QQ531 may compute or estimate the monitored quantities. The reconfiguring of OTT connection QQ550 may include message format, retransmission settings, preferred routing etc.; the reconfiguring need not affect base station QQ520, and it may be unknown or imperceptible to base station QQ520. Such procedures and functionalities may be known and practiced in the art. In certain embodiments, measurements may involve proprietary UE signaling facilitating host computer QQ510's measurements of throughput, propagation times, latency and the like. The measurements may be implemented in that software QQ511 and QQ531 causes messages to be transmitted, in particular empty or 'dummy' messages, using OTT connection QQ550 while it monitors propagation times, errors etc.

Figure 11:
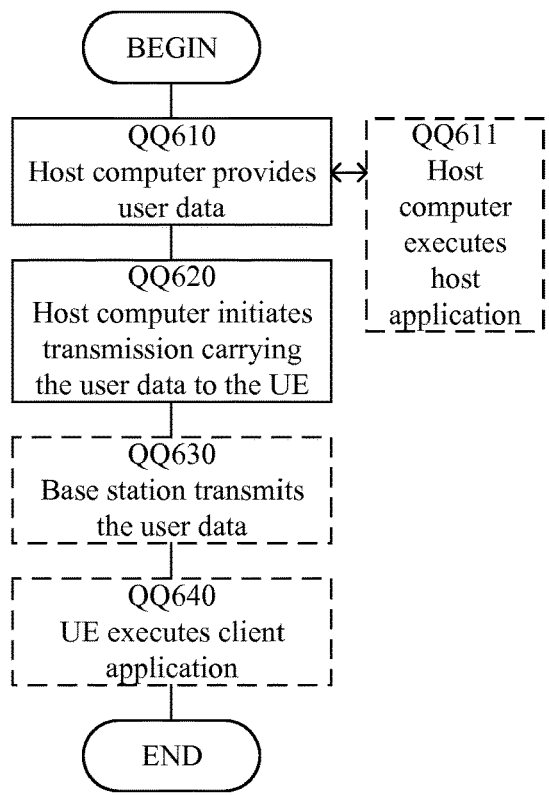
FIG. 11 is a flowchart illustrating example method steps implemented in a communication system including a host computer, a base station and a user equipment in accordance with some embodiments.

FIG. 11 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 11 will be included in this section. In step QQ610, the host computer provides user data. In substep QQ611 (which may be optional) of step QQ610, the host computer provides the user data by executing a host application. In step QQ620, the host computer initiates a transmission carrying the user data to the UE. In step QQ630 (which may be optional), the base station transmits to the UE the user data which was carried in the transmission that the host computer initiated, in accordance with the teachings of the embodiments described throughout this disclosure. In step QQ640 (which may also be optional), the UE executes a client application associated with the host application executed by the host computer.

Figure 12:
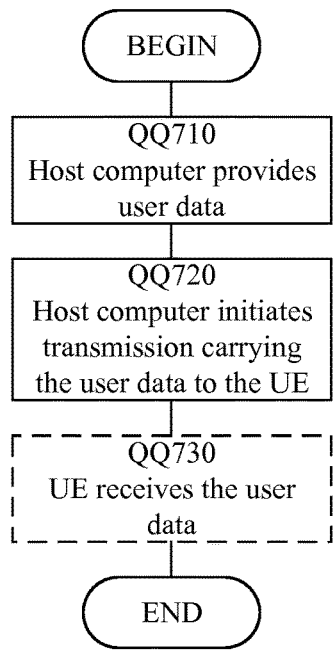
FIG. 12 is a flowchart illustrating example method steps implemented in a communication system including a host computer, a base station and a user equipment in accordance with some embodiments.

FIG. 12 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 12 will be included in this section. In step QQ710 of the method, the host computer provides user data. In an optional substep (not shown) the host computer provides the user data by executing a host application. In step QQ720, the host computer initiates a transmission carrying the user data to the UE. The transmission may pass via the base station, in accordance with the teachings of the embodiments described throughout this disclosure. In step QQ730 (which may be optional), the UE receives the user data carried in the transmission.

Figure 13:
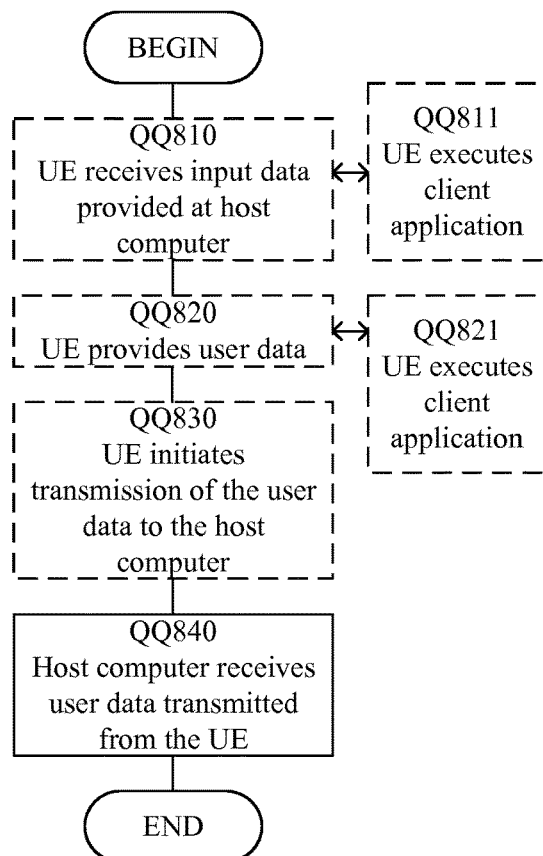
FIG. 13 is a flowchart illustrating example method steps implemented in a communication system including a host computer, a base station and a user equipment in accordance with some embodiments.

FIG. 13 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 13 will be included in this section. In step QQ810 (which may be optional), the UE receives input data provided by the host computer. Additionally or alternatively, in step QQ820, the UE provides user data. In substep QQ821 (which may be optional) of step QQ820, the UE provides the user data by executing a client application. In substep QQ811 (which may be optional) of step QQ810, the UE executes a client application which provides the user data in reaction to the received input data provided by the host computer. In providing the user data, the executed client application may further consider user input received from the user. Regardless of the specific manner in which the user data was provided, the UE initiates, in substep QQ830 (which may be optional), transmission of the user data to the host computer. In step QQ840 of the method, the host computer receives the user data transmitted from the UE, in accordance with the teachings of the embodiments described throughout this disclosure.

Figure 14:
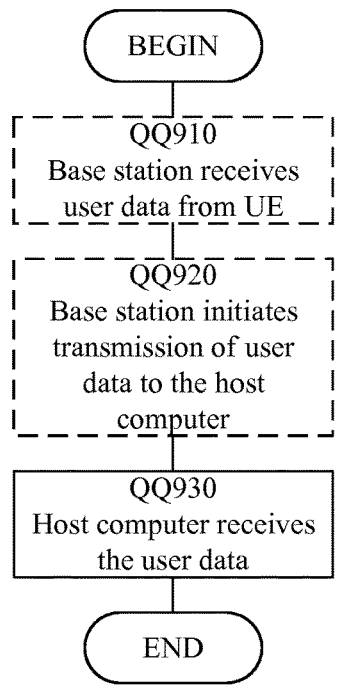
FIG. 14 is a flowchart illustrating example method steps implemented in a communication system including a host computer, a base station and a user equipment in accordance with some embodiments.

FIG. 14 is a flowchart illustrating a method implemented in a communication system, in accordance with one embodiment. The communication system includes a host computer, a base station and a UE which may be those described with reference to FIGS. 9 and 10. For simplicity of the present disclosure, only drawing references to FIG. 14 will be included in this section. In step QQ910 (which may be optional), in accordance with the teachings of the embodiments described throughout this disclosure, the base station receives user data from the UE. In step QQ920 (which may be optional), the base station initiates transmission of the received user data to the host computer. In step QQ930 (which may be optional), the host computer receives the user data carried in the transmission initiated by the base station.

Generally, all terms used herein are to be interpreted according to their ordinary meaning in the relevant technical field, unless a different meaning is clearly given and/or is implied from the context in which it is used.

Reference has been made herein to various embodiments. However, a person skilled in the art would recognize numerous variations to the described embodiments that would still fall within the scope of the claims.

For example, the method embodiments described herein discloses example methods through steps being performed in a certain order. However, it is recognized that these sequences of events may take place in another order without departing from the scope of the claims. Furthermore, some method steps may be performed in parallel even though they have been described as being performed in sequence. Thus, the steps of any methods disclosed herein do not have to be performed in the exact order disclosed, unless a step is explicitly described as following or preceding another step and/or where it is implicit that a step must follow or precede another step.

In the same manner, it should be noted that in the description of embodiments, the partition of functional blocks into particular units is by no means intended as limiting. Contrarily, these partitions are merely examples. Functional blocks described herein as one unit may be split into two or more units. Furthermore, functional blocks described herein as being implemented as two or more units may be merged into fewer (e.g. a single) unit.

Any feature of any of the embodiments disclosed herein may be applied to any other embodiment, wherever suitable. Likewise, any advantage of any of the embodiments may apply to any other embodiments, and vice versa.

Hence, it should be understood that the details of the described embodiments are merely examples brought forward for illustrative purposes, and that all variations that fall within the scope of the claims are intended to be embraced therein.

EXAMPLE EMBODIMENTS

Group A Embodiments

A1. A method performed by a wireless device, WCD, for handover control, the WCD connected to a serving network node, SNWN, of a wireless communication network, wherein the SNWN provides a serving cell, the method comprising the method comprising:
establishing (110, 401) a handover control configuration shared by the WCD and the SNWN, the handover control configuration comprising a neighboring cell measurement triggering criterion, a handover triggering criterion, and transmission resource parameters for measurement signals of a neighboring cell provided by a neighboring network node, NNWN, of the wireless communication network;
performing (120, 403), on measurement signals (425) of the serving cell, channel quality measurements of the serving cell;
transmitting (130), to the SNWN, a serving cell measurement report (426) indicative of the channel quality measurements of the serving cell;
detecting (140, 405) fulfillment of the neighboring cell measurement triggering criterion of the handover control configuration based on the channel quality measurements of the serving cell;
performing (160, 407), on measurement signals (429, 431) of the neighboring cell, channel quality measurements of the neighboring cell responsive to the detection of fulfillment of the neighboring cell measurement triggering criterion and according to the transmission resource parameters of the handover control configuration;
transmitting (170), to the SNWN, a neighboring cell measurement report (432) indicative of the channel quality measurements of the neighboring cell; and
detecting (180, 408) fulfillment of the handover triggering criterion of the handover control configuration based on the channel quality measurements of the neighboring cell.

A2. The method of any of the previous embodiments in Group A, further comprising:
providing user data; and
forwarding the user data to a host computer via the transmission to the base station.

Group B Embodiments

B1. A method performed by a base station, SNWN, for handover control, wherein the SNWN is of a wireless communication network, is connected to a wireless communication device, WCD, and provides a serving cell of the WCD, the method comprising:

establishing (210, 401) a handover control configuration shared by a WCD and the SNWN, the handover control configuration comprising a neighboring cell measurement triggering criterion, a handover triggering criterion, and transmission resource parameters for measurement signals of a neighboring cell provided by a neighboring network node, NNWN, of the wireless communication network;

receiving (230), from the WCD, a serving cell measurement report (426) indicative of channel quality measurements of the serving cell performed by the WCD;

detecting (240, 406) fulfillment of the neighboring cell measurement triggering criterion of the handover control configuration based on the channel quality measurements of the serving cell;

issuing (250), for the NNWN and responsive to the detection of fulfillment of the neighboring cell measurement triggering criterion, a triggering signal (427, 428) for triggering transmission of the measurement signals of the neighboring cell according to the transmission resource parameters of the handover control configuration;

receiving (270), from the WCD, a neighboring cell measurement report (432) indicative of channel quality measurements of the neighboring cell; and detecting (280, 409) fulfillment of the handover triggering criterion of the handover control configuration based on the channel quality measurements of the neighboring cell.

B2. The method of any of the previous embodiments in Group B, further comprising:
obtaining user data; and
forwarding the user data to a host computer or a wireless device.

Group C Embodiments

C1. A wireless device for handover control, the wireless device comprising:
processing circuitry configured to perform any of the steps of any of the Group A embodiments; and
power supply circuitry configured to supply power to the wireless device.

C2. A base station for handover control, the base station comprising:
processing circuitry configured to perform any of the steps of any of the Group B embodiments;
power supply circuitry configured to supply power to the base station.

C3. A user equipment (UE) for handover control, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and a battery connected to the processing circuitry and configured to supply power to the UE.

Group D Embodiments

D1. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps described for the Group B embodiments.

D2. The communication system of embodiment D1 further including the base station.

D3. The communication system of any of embodiments D1 through D2, further including the UE, wherein the UE is configured to communicate with the base station.

D4. The communication system of any of embodiments D1 through D3, wherein:
the processing circuitry of the host computer is configured to execute a host application, thereby providing the user data; and
the UE comprises processing circuitry configured to execute a client application associated with the host application.

D5. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps described for the Group B embodiments.

D6. The method of embodiment D5, further comprising, at the base station, transmitting the user data.

D7. The method of any of embodiments D5 through D6, wherein the user data is provided at the host computer by executing a host application, the method further comprising, at the UE, executing a client application associated with the host application.

D8. A user equipment (UE) configured to communicate with a base station, the UE comprising a radio interface and processing circuitry configured to perform the method of any of embodiments D5 through D7.

D9. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps described for the Group A embodiments.

D10. The communication system of embodiment D9, wherein the cellular network further includes a base station configured to communicate with the UE.

D11. The communication system of any of embodiments D9 through D10, wherein:
the processing circuitry of the host computer is configured to execute a host application, thereby providing the user data; and the UE's processing circuitry is configured to execute a client application associated with the host application.

D12. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps described for the Group A embodiments.

D13. The method of embodiment D12, further comprising at the UE, receiving the user data from the base station.

D14. A communication system including a host computer comprising:
communication interface configured to receive user data originating from a transmission from a user equipment (UE) to a base station,
wherein the UE comprises a radio interface and processing circuitry, the UE's processing circuitry configured to perform any of the steps described for the Group A embodiments.

D15. The communication system of embodiment D14, further including the UE.

D16. The communication system of any of embodiments D14 through D15, further including the base station, wherein the base station comprises a radio interface configured to communicate with the UE and a communication interface configured to forward to the host computer the user data carried by a transmission from the UE to the base station.

D17. The communication system of any of embodiments D14 through D16, wherein:
the processing circuitry of the host computer is configured to execute a host application; and
the UE's processing circuitry is configured to execute a client application associated with the host application, thereby providing the user data.

D18. The communication system of any of embodiments D14 through D17, wherein:
the processing circuitry of the host computer is configured to execute a host application, thereby providing request data; and
the UE's processing circuitry is configured to execute a client application associated with the host application, thereby providing the user data in response to the request data.

D19. A method implemented in a communication system including a host computer, a base station and a user equipment (UE), the method comprising:
at the host computer, receiving user data transmitted to the base station from the UE, wherein the UE performs any of the steps described for the Group A embodiments.

D20. The method of embodiment D19, further comprising, at the UE, providing the user data to the base station.

D21. The method of any of embodiments D19 through D20, further comprising:
at the UE, executing a client application, thereby providing the user data to be transmitted; and
at the host computer, executing a host application associated with the client application.

D22. The method of any of embodiments D19 through D21, further comprising:
at the UE, executing a client application; and
at the UE, receiving input data to the client application, the input data being provided at the host computer by executing a host application associated with the client application,
wherein the user data to be transmitted is provided by the client application in response to the input data.

D23. A user equipment (UE) configured to communicate with a base station, the UE comprising a radio interface and processing circuitry configured to perform the method of any of embodiments D19 through D22.

D24. A communication system including a host computer comprising a communication interface configured to receive user data originating from a transmission from a user equipment (UE) to a base station, wherein the base station comprises a radio interface and processing circuitry, the base station's processing circuitry configured to perform any of the steps described for the Group B embodiments.

D25. The communication system of embodiment D24 further including the base station.

D26. The communication system of any of embodiments D24 through D25, further including the UE, wherein the UE is configured to communicate with the base station.

D27. The communication system of any of embodiments D24 through D25, wherein:
the processing circuitry of the host computer is configured to execute a host application;
the UE is configured to execute a client application associated with the host application, thereby providing the user data to be received by the host computer.

D28. A method implemented in a communication system including a host computer, a base station and a user equipment (UE), the method comprising:
at the host computer, receiving, from the base station, user data originating from a transmission which the base station has received from the UE, wherein the UE performs any of the steps described for the Group A embodiments.

D29. The method of embodiment D28, further comprising at the base station, receiving the user data from the UE.

D30. The method of any of embodiments D28 through D29, further comprising at the base station, initiating a transmission of the received user data to the host computer.

D31. A method implemented in a communication system including a host computer, a base station and a user equipment (UE), the method comprising:
at the host computer, receiving, from the base station, user data originating from a transmission which the base station has received from the UE, wherein the base station performs any of the steps described for the Group B embodiments.

D32. The method of embodiment D31, further comprising at the base station, receiving the user data from the UE.

D33. The method of any of embodiments D31 through D32, further comprising at the base station, initiating a transmission of the received user data to the host computer.

The invention claimed is:

1. A handover control method for a wireless communication device, WCD, connected to a serving network node, SNWN, of a wireless communication network, the SNWN providing a serving cell, the method comprising:
establishing a handover control configuration shared by the WCD and the SNWN, the handover control configuration comprising a neighboring cell measurement triggering criterion, a handover triggering criterion, and transmission resource parameters for measurement signals of a neighboring cell provided by a neighboring network node, NNWN, of the wireless communication network;
performing, on measurement signals of the serving cell, channel quality measurements of the serving cell;

transmitting, to the SNWN, a serving cell measurement report indicative of the channel quality measurements of the serving cell;
detecting fulfillment of the neighboring cell measurement triggering criterion of the handover control configuration based on the channel quality measurements of the serving cell;
performing, on measurement signals of the neighboring cell, channel quality measurements of the neighboring cell responsive to the detection of fulfillment of the neighboring cell measurement triggering criterion and according to the transmission resource parameters of the handover control configuration;
transmitting, to the SNWN, a neighboring cell measurement report indicative of the channel quality measurements of the neighboring cell;
detecting fulfillment of the handover triggering criterion of the handover control configuration based on the channel quality measurements of the neighboring cell; and
performing handover to the neighboring cell responsive to the detection of fulfillment of the handover triggering criterion, the handover excluding further signaling between the SNWN and the WCD.

2. The method of claim 1, wherein establishing the handover control configuration shared by the WCD and the SNWN comprises receiving, from the SNWN, a configuration signal indicative of the handover control configuration.

3. The method of claim 1, further comprising:
receiving, from the SNWN, an indication of time synchronization mismatch between the serving cell and the neighboring cell; and
compensating for the time synchronization mismatch to enable the performance of channel quality measurements of the neighboring cell.

4. The method of claim 1, wherein the handover triggering criterion of the handover control configuration comprises a neighboring cell channel quality threshold value, and wherein the handover triggering criterion is fulfilled when the channel quality measurements of the neighboring cell falls above the neighboring cell channel quality threshold value.

5. The method of claim 1, wherein the neighboring cell measurement triggering criterion of the handover control configuration comprises a serving cell channel quality threshold value, and wherein the neighboring cell measurement triggering criterion is fulfilled when the channel quality measurements of the serving cell falls below the serving cell channel quality threshold value.

6. The method of claim 1, wherein the transmission resource parameters of the handover control configuration for measurement signals of the neighboring cell comprise one or more of: time-frequency resource allocation of the measurement signals of the neighboring cell and active-inactive time pattern of the measurement signals of the neighboring cell.

7. The method of claim 1, wherein the transmission resource parameters of the handover control configuration for measurement signals of the neighboring cell coincide with transmission resource parameters for measurement signals of the serving cell.

8. The method of claim 1, wherein the measurement signals are channel state information reference signals, CSI-RS, the channel quality measurements are channel quality indicator, CQI, measurements, and the serving cell measurement report is a channel state information, CSI, report.

9. A handover control method for a network node, SNWN, of a wireless communication network, the SNWN being connected to a wireless communication device, WCD, and providing a serving cell of the WCD, the method comprising:
establishing a handover control configuration shared by the WCD and the SNWN, the handover control configuration comprising a neighboring cell measurement triggering criterion, a handover triggering criterion, and transmission resource parameters for measurement signals of a neighboring cell provided by a neighboring network node, NNWN, of the wireless communication network;
receiving, from the WCD, a serving cell measurement report indicative of channel quality measurements of the serving cell performed by the WCD;
detecting fulfillment of the neighboring cell measurement triggering criterion of the handover control configuration based on the channel quality measurements of the serving cell;
issuing, for the NNWN and responsive to the detection of fulfillment of the neighboring cell measurement triggering criterion, a triggering signal for triggering transmission of the measurement signals of the neighboring cell according to the transmission resource parameters of the handover control configuration;
receiving, from the WCD, a neighboring cell measurement report indicative of channel quality measurements of the neighboring cell;
detecting fulfillment of the handover triggering criterion of the handover control configuration based on the channel quality measurements of the neighboring cell; and
performing handover of the WCD to the neighboring cell responsive to the detection of fulfillment of the handover triggering criterion, the handover excluding further signaling between the SNWN and the WCD.

10. The method of claim 9, wherein establishing the handover control configuration shared by the WCD and the SNWN comprises transmitting, to the WCD, a configuration signal indicative of the handover control configuration.

11. The method of claim 9, further comprising:
transmitting, to the WCD, an indication of time synchronization mismatch between the serving cell and the neighboring cell.

12. A wireless communication device, WCD, comprising an arrangement for the WCD connectable to a serving network node, SNWN, of a wireless communication network, the SNWN being configured to provide a serving cell, the arrangement comprising controlling circuitry configured to cause:
establishment of a handover control configuration shared by the WCD and the SNWN, the handover control configuration comprising a neighboring cell measurement triggering criterion, a handover triggering criterion, and transmission resource parameters for measurement signals of a neighboring cell provided by a neighboring network node, NNWN, of the wireless communication network;
performance, on measurement signals of the serving cell, of channel quality measurements of the serving cell;
transmission, to the SNWN, of a serving cell measurement report indicative of the channel quality measurements of the serving cell;

detection of fulfillment of the neighboring cell measurement triggering criterion of the handover control configuration based on the channel quality measurements of the serving cell;

performance, on measurement signals of the neighboring cell, of channel quality measurements of the neighboring cell responsive to the detection of fulfillment of the neighboring cell measurement triggering criterion and according to the transmission resource parameters of the handover control configuration;

transmission, to the SNWN, of a neighboring cell measurement report indicative of the channel quality measurements of the neighboring cell;

detection of fulfillment of the handover triggering criterion of the handover control configuration based on the channel quality measurements of the neighboring cell; and performance of a handover of the WCD to the neighboring cell responsive to the detection of fulfillment of the handover triggering criterion, the handover excluding further signaling between the SNWN and the WCD.

13. A network node, SNWN, comprising an arrangement for the SNWN of a wireless communication network, the SNWN being connectable to a wireless communication device, WCD, and configured to provide a serving cell of the WCD, the arrangement comprising controlling circuitry configured to cause:

establishment of a handover control configuration shared by the WCD and the SNWN, the handover control configuration comprising a neighboring cell measurement triggering criterion, a handover triggering criterion, and transmission resource parameters for measurement signals of a neighboring cell provided by a neighboring network node, NNWN, of the wireless communication network;

reception, from the WCD, of a serving cell measurement report indicative of channel quality measurements of the serving cell performed by the WCD;

detection of fulfillment of the neighboring cell measurement triggering criterion of the handover control configuration based on the channel quality measurements of the serving cell;

issuance, for the NNWN and responsive to the detection of fulfillment of the neighboring cell measurement triggering criterion, of a triggering signal for triggering transmission of the measurement signals of the neighboring cell according to the transmission resource parameters of the handover control configuration;

reception, from the WCD, of a neighboring cell measurement report indicative of channel quality measurements of the neighboring cell;

detection of fulfillment of the handover triggering criterion of the handover control configuration based on the channel quality measurements of the neighboring cell; and performance of a handover of the WCD to the neighboring cell responsive to the detection of fulfillment of the handover triggering criterion, the handover excluding further signaling between the SNWN and the WCD.

* * * * *